United States Patent Office 3,505,394
Patented Apr. 7, 1970

3,505,394
OXIDATIVE CARBONYLATION
Kenneth L. Olivier, Placentia, Calif., assignor to Union Oil Company of California, Los Angeles, Calif., a corporation of California
No Drawing. Filed Oct. 4, 1966, Ser. No. 584,106
Int. Cl. C07c 67/04, 51/14
U.S. Cl. 260—497                    5 Claims

ABSTRACT OF THE DISCLOSURE

Hydrocarbon olefins are oxidatively carbonylated by contracting the olefin, carbon monoxide and oxygen with a substantially anhydrous reaction medium containing a Group VIII noble metal and a redox agent for the Group VIII noble metal. This reaction can be performed without the necessity for a dehydrating agent by employing a high partial pressure of carbon monoxide in the reaction gas phase, e.g., from about 40 to 70 percent of the total reaction pressure.

DESCRIPTION OF THE INVENTION

This invention relates to the oxidative carbonylation of olefins to carboxylic acids and in particular to unsaturated carboxylic acids or their precursors. In a specific embodiment this invention relates to the oxidative carbonylation of ethylene to acrylic acid.

In copending application Ser. No. 371,751, there is disclosed a method for the oxidative carbonylation of olefins to aplha, beta-unsaturated carboxylic acids and beta-acyloxy carboxylic acids. The reaction described in that application comprises contacting an olefin, carbon monoxide and oxygen with an organic solvent containing a platinum group metal and, optionally, a redox agent. The reaction can be performed under relatively mild conditions and exhibits an attractive rate at temperature from about 30° to 300° C. and preferably superatmospheric pressures.

Because the platinum group metal catalyst under these conditions also exhibits actively for the oxidation of olefins to carbonyl compounds when water is present, the aforementioned application prescribes that the reaction be initiated and maintained under anhydrous conditions. This is achieved in accordance with the method described in the application by the addition of a dehydrating agent such as a carboxylic acid anhydride, an acyl halide, an inorganic acid anhydride such as boric anhydride, or a dehydrated crystalline aluminosilicate molecular sieve. Of these, the carboxylic acid anhydride is preferred for ease of handling and effectiveness.

The presence of the carboxylic acid anhydride in the reaction medium, however, complicates the product recovery steps and it is therefore desirable to free the reaction from this restriction.

I have now found that the aforementioned oxidative carbonylation can be conducted without the necessity to employ a dehydrating agent or use precautionary steps to preclude the presence of water in the reaction medium. I have found that a tolerance for water can be imparted to the reaction by use of relatively high concentrations of carbon monoxide. Water is not formed as a product of the desired reaction since this reaction can be represented by the following equation using ethylene as a model reactant:

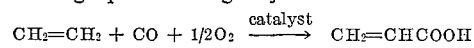

Spurious side reactions such as those which would form an unsaturated ester from the olefin, e.g., vinyl acetate from ethylene, can result in the formation of water and for this reason the aforementioned parent application prescribed performing the reaction under anhydrous conditions. The subject matter of my invention, however, comprises the discovery that these elaborate safeguards to maintain anhydrous conditions are not entirely necessary and can be dispensed with provided high concentrations of carbon monoxide reactant are employed. Carbon monoxide partial pressures in the reaction system should be from 30 to about 95 percent of the total reaction pressure.

Examples of olefins useful as reactants are the aliphatic hydrocarbon olefins having from 2 to about 12 carbons such as ethylene, propylene, butene-1, butene-2, pentene-2, 2-methyl-butene-1, hexene-1, octene-3, 2-propylhexene-1, decene-2, 4,4-dimethylnonene-1, dodecene-1, 6-propyldecene-1, tetradecene-5, 7-ethyldecene-3, hexadecene-1, 4-ethyltridecene-2, octadecene-1, 5,5-dipropyldodecene-3, eicosene-7, etc. Of these the aliphatic hydrocarbon olefins having from 2 to about 8 carbons are preferred. Also preferred are the alpha olefins since these olefins having an unsaturated terminal carbon are more reactive than the other olefins.

The reaction is performed under liquid phase conditions in the presence of a liquid organic solvent which has a solvency for the catalyst and which, preferably, is inert to the reaction conditions. Various organic liquids can be employed for this purpose such as sulfones, amides, ketones, ethers and esters. Carboxylic acids such as the lower molecular weight aliphatic acids are preferred solvents and even when another solvent is used, its is preferred to maintain at least 10 percent of the solvent as an aliphatic carboxylic acid.

Illustrative of the preferred solvents are acetic, propionic, butyric, pentanoic, hexanoic, heptanoic, octanoic, pivalic, acrylic, beta-acetoxypropionic, etc. Of these, the aliphatic carboxylic acids having from about 2 to about 6 carbons are preferred. The carboxylic acids are not entirely inert under the oxidation conditions in that the carboxylic acids add to the olefin double bond to form beta-acyloxy compounds. These materials, however, can be readily pyrolyzed to recover both the carboxylic acid for reuse as the reaction medium and the desired unsaturated acid.

Another class of organic solvents that have sufficient solvency for the catalyst salts, that are inert to the oxidative carbonylation, and that can be used in lieu of up to 90 percent of the aforementioned carboxylic acids are various amides such as formamide, dimethyl formamide, ethylisopropyl formamide, acetamide, N-phenyl acetamide, N,N-dipropyl acetamide, isobutyramide, N-ethyl isobutyramide, isovaleramide, N,N-n-caprylamide, isoundecylamide, etc.

Various alkyl and aryl ketones can also be employed in the reaction solvent, e.g., acetone, methylethyl ketone, diethyl ketone, diisopropyl ketone, ethyl n-butyl ketone, methyl-n-amyl ketone, cyclohexanone, di-iso-butyl ketone, etc.

Various esters can also be employed in the solvent, e.g., ethyl formate, methyl acetate, ethyl acetate, n-propyl formate, isopropyl acetate, ethyl propionate, n-propyl acetate, sec-butyl acetate, isobutyl acetate, ethyl n-butyrate, n-butyl acetate, iso-amyl acetate, n-amyl acetate, ethyl formate, ethylene glycol diacetate, glycol diformate, cyclohexyl acetate, furfuryl acetate, iso-amyl n-butyrate, diethyl oxalate, isoamyl isovalerate, methyl benzoate, diethyl malonate, valerolactone, ethyl benzoate, methyl salicylate, n-propyl benzoate, n-dibutyl oxalate, n-butyl benzoate, diiso-amyl phthalate, dimethyl phthalate, diethyl phthalate, benzyl benzoate, n-dibutyl phthalate, etc.

As previously mentioned, the reaction medium should contain catalytic amounts of a platinum group metal. The platinum group metal can be of the palladium subgroup or the platinum subgroup, i.e., palladium, rhodium or ruthenium or platinum, osmium or iridium. While all of these metals are active for the reaction, I prefer palladium because of its demonstrated greater activity. The platinum group metal can be employed in amounts between about 0.001 and about 5 weight percent of the liquid reaction medium; preferably between about 0.04 and about 2.0 weight percent. The platinum group metal can be added to the reaction medium as a finely divided metal, as a soluble salt or as a chelate. Preferably, the metal in its most oxidized form, i.e., as a soluble salt or chelate, is introduced into the reaction zone to avoid the formation of undesired quantities of water. Examples of suitable salts are the halides and carboxylates of the metals such as palladium chloride, rhodium acetate, ruthenium bromide, osmium propionate, iridium benzoate, palladium isobutyrate, etc.

To facilitate the rate of oxidation by rendering it more facile to oxidize the reduced form of the platinum metal, I prefer to employ a reaction medium that contains a soluble halide, i.e., a bromide or chloride (preferably a chloride). The halide can be added as elemental chlorine or bromine; however, it is preferred to employ the less volatile compounds such as hydrogen, alkali metal or ammonium halides, e.g., hydrogen chloride; hydrogen bromide, cesium chloride, potassium bromide, sodium bromide, lithium chloride; ammonium bromide, ammonium chloride, etc. Also, any of the aforementioned platinum group metals can be added to supply a portion of the bromide or chloride and, when the hereafter mentioned multivalent metal redox salts are employed, these too can be added as the chloride or bromide. Acyl halides which, as previously mentioned, also serve as organic dehydrating agents can also be added. Thus, the use of acetyl chloride serves to remove any undesired water and also provides a continuous source of hydrogen chloride, thereby replacing any chloride lost during the reaction by vaporization or side reactions. Examples of useful acyl halides include the chlorides and bromides having from 1 to about 10 carbons, preferably from 2 to about 5 carbons.

In general, sufficient of any of the aforementioned halides can be added to provide between about 0.05 and about 5.0 weight percent halide in the reaction zone; preferably concentrations between about 0.1 and about 3.0 weight percent are employed. This amount of halide is preferably also in excess of the stoichiometric quantity necessary to form the halide of the most oxidized state of platinum group metal, e.g., in excess of two atomic weights of halogen per atomic weight of palladium present. In this manner, a rapid oxidation can be achieved.

As previously mentioned, various redox compounds can optionally be used in the reaction medium to accelerate the rate of reaction. In general, any multivalent metal salt having an oxidation potential higher, i.e., more positive than the platinum metal in the solution, can be used. Typical of such are the soluble salts of the multivalent metal ions such as the carboxylates, e.g., propionates, benzoates, acetates, etc.; nitrates, halides, e.g., bromides, chlorides, etc.; of copper, iron, manganese, cobalt, mercury, nickel, cerium, chromium, molybdenum or vanadium. Of these, cupric and ferric salts are preferred and cupric salts are most preferred. In general the multivalent metal ion salt is added to the reaction medium to provide a concentration of the metal therein between about 0.1 and about 10 weight percent; preferably between about 0.5 and about 3.0 weight percent.

Various other oxidizing agents can also be employed to accelerate the rate of reaction. Included in such agents are the nitrogen oxides that function as redox agents similar to those previously described. These nitrogen oxides can be employed as the only redox agent in the reaction medium or they can be employed jointly with one or more of the aforedescribed redox metal salts such as a combination of a nitrogen oxide and a cupric redox agent or ferric redox agent. In general, between about 0.01 and about 3 weight percent of the reaction medium; preferably between about 0.1 and about 1 weight percent; calculated as nitrogen dioxide can comprise a nitrogen oxide that is added as a nitrate or nitrite salt or nitrogen oxide vapors. The nitrogen oxides can be added to the reaction medium in various forms, e.g., nitrogen oxide vapors such as nitric oxide, nitrogen dioxide, nitrogen tetraoxide, etc. can be introduced into contact with the reaction medium during the oxidation to fix the aforementioned nitrogen oxide content therein or soluble nitrate or nitrite salts such as sodium nitrate, lithium nitrate, lithium nitrite, potassium nitrate, cesium nitrate, etc. can be added to the reaction medium.

The reaction can be conducted in the presence of carboxylate anions which can favor the reaction. Examples of useful anions are those of the low molecular weight acids such as acetic, propionic, butyric, isobutyric, valeric, isovaleric, pivalic, etc. Acetate ions are preferred. The concentration of the anions can be from about 0.01 to about 0.7 normality; preferably from about 0.04 to about 0.3 normality. These values correspond to from about 0.05 to 7 weight percent; preferably from about 0.24 to 3 weight percent.

The soluble anion can be added to the reaction medium as a soluble salt such as an alkali metal or ammonium salt, e.g., sodium acetate, lithium acetate, potassium propionate, ammonium butyrate, diethyl ammonium acetate, tributyl ammonium valerate, pyridinium acetate, etc. The organic ammonia salts can include the salts of alkyl, aryl and heterocyclic amines having from 1 to about 16 carbons. The identity of the organic portion of the ammonium salt is not significant in the reaction provided that the ammonium salt is soluble in the medium.

The process is operated continuously wherein the platinum group metal and redox agent participate in a catalytic manner. In this method, oxygen is introduced together with the olefin and carbon monoxide into contact with the liquid reaction medium. The carbonylation of the olefin and oxidation to the carboxylic acid results in the stoichiometric reduction of the platinum group metal. The introduction of oxygen serves to reoxidize the reduced metal to its more oxidized and active form. This oxidation is known to form a stoichiometric quantity of water. Surprisingly, water did not accumulate in the reaction medium nor did the course of the reaction become altered because of the presence of water to favor the less desired products such as the unsaturated esters or carbonyl compounds. Instead, the water apparently participated in the oxidative carbonylation reaction to produce the desired alpha,beta-ethylenically unsaturated carboxylic acids and the beta-acyloxy carboxylic acids directly.

In the commercial application of this invention, the oxygen introduction is controlled at a rate in response to the oxygen content of the exit gases from the reaction zone. Continuous or intermittent introduction can be employed; however, continuous introduction is preferred. Preferably, the rate of oxygen introduction is controlled relative to the olefin and carbon monoxide rates so as to maintain the oxygen content of the exit gases below the explosive concentration, i.e., less than about 10 and preferably less than about 3 volume percent. Under these conditions the excess gas which comprises the olefin (when a gaseous olefin reactant is used) and carbon monoxide can be recycled to the liquid reaction medium. When the olefin is a liquid under the reaction conditions, an inert gas such as nitrogen, air or mixtures of nitrogen and air can be employed to dilute the gas phase and exit gas stream from the reactor and thereby avoid explosive gas compositions.

The reaction can be performed under relatively mild conditions, e.g., temperatures from about 30° to about 300° C.; preferably from about 90° to about 200° C. The reaction pressure employed is sufficient to maintain a liquid phase and preferably, when gaseous olefins are employed, superatmospheric pressures are used to increase the solubility of the olefin in the reaction medium and thereby accelerate the reaction rate. Superatmospheric pressures are even preferred with the olefins that are normally liquid at the reaction conditions so that the solubility and hence, reactivity, of carbon monoxide in the reaction system is promoted. Accordingly, pressures from atmospheric to about 200 atmospheres or more, preferably from about 10 to 100 atmospheres, are used.

The discovery of my invention is that the use of high partial pressures of carbon monoxide in this oxidative carbonylation will insure the formation of the desired ethylenically unsaturated carboxylic acids and precursors thereof without the necessity to add an extraneous dehydrating agent to the reactants. While the presence of water in the reaction medium will not completely preclude the desired oxidative carbonylation, it is nevertheless preferred to conduct the reaction under substantially anhydrous conditions, i.e., in reaction media containing less than about 5 weight percent water. Preferably, reaction media containing less than about 2 weight percent water are used and most preferably the reaction is initiated under essentially anhydrous conditions. The carbonylation is conducted at partial pressures of carbon monoxide from about 30 to about 95 percent of the total pressure in the reaction zone. Preferably the partial pressure of the carbon monoxide is from about 40 to about 70 percent of the total reaction pressure.

During the oxidation a portion of the liquid reaction media can be continuously withdrawn and distilled to recover the desired products from the reaction medium which contains the catalyst salts and which is recycled for further contact to the reaction zone. Preferably care is exercised to remove most quantities of water from this recycle reaction to thereby provide a substantially anhydrous recycle medium. The removal of water from this stream can be facilitated by azeotropic distillation, e.g., by the addition of a suitable azeotrope-forming agent such as a hydrocarbon, benzene, ester, e.g., ethyl acetate, etc. to remove all water in the distillation and/or by the addition of any of the known dehydrating agents such as acetic anhydride, phthalic anhydride, acetyl chloride, etc. to the reaction stream. To permit recovery of the product by distillation, it is preferred to employ a high-boiling carboxylic acid or other high-boiling organic solvents in the reaction medium. It is preferred that a portion of the reaction medium comprise acetic acid in an amount from about 3 to about 75 percent. Since the acetic acid is more volatile than the carbonylated products, the distillation recovery of the products necessitates the removal of the acetic acid. This acetic acid is recovered as a distillate and returned for further reaction. The carbonylated product can then be recovered by distillation of the remainder of the reaction medium that comprises the high-boiling acid which contains the catalyst. After distillation of the product, e.g., acrylic acid and a beta-acyloxy propionic acid, the distillation residue can be combined with the acetic acid and returned to the reaction zone.

The following examples will illustrate the practice of the invention and serve to demonstrate the results obtainable thereby:

EXAMPLE 1

To determine the effect of carbon monoxide partial pressure on the course of the oxidation reaction, a series of experiments were performed wherein this variable was altered. In the experiments, a one-gallon Teflon-lined autoclave was charged with one gram palladium chloride, 5 grams lithium chloride, 5 grams cupric chloride, 5 grams lithium acetate and 500 grams acetic acid. Carbon monoxide was introduced at varied amounts during the series of experiments and ethylene was then added to bring the total pressure to 900 p.s.i.g. The autoclave was closed, heated to 280° F. and alternate additions of oxygen and nitrogen of about 20 p.s.i. increments were made during a 20-minute reaction period. After completion of the reaction, the autoclave was cooled, the gases were vented into a gas receiver, the liquid product was removed and distilled to separate the amounts of products indicated in the following table:

| Experiment | Reactants, p.s.i. | | Products, grams | | | | |
|---|---|---|---|---|---|---|---|
| | Ethylene | Carbon monoxide | Low boiling | Acrylic acid | Propionic acid | Beta-acetoxy propionic acid | $CO_2$ |
| 1 | 300 | 300 | 7 | 3.3 | 6 | 7 | 51 |
| 2 | 600 | 300 | 54 | 10 | 16 | 43 | 21 |
| 3 | 450 | 450 | 6 | 9 | 3 | 60 | 38 |
| 4 | 300 | 600 | 0 | 4 | 1.5 | 8 | 60 |
| 5 | 150 | 750 | 1 | 5 | 2.5 | 6 | 64 |
| 6 | 750 | 150 | 96 | 6 | 22 | 28 | 13 |

The low-boiling products comprised a mixture of acetaldehyde, vinyl acetate and slight amounts of saturated esters, i.e., methyl and ethyl acetates. The data indicate that the partial pressure of carbon monoxide in the reaction zone significantly influenced the yields of products. To illustrate, Experiments 4 and 5 which were performed at high carbon monoxide partial pressures produced acrylic and beta-acetoxy propionic acids as the major liquid products whereas performing the oxidation under high partial pressures of ethylene (Experiments 2 and 6) produced high yields of the low-boiling products. In the series of experiments, no dehydrating agent was added to the reaction zone and therefore it can be seen that the course of the reaction was altered to favor the production of the carbonylated products simply by increasing the partial pressure of the carbon monoxide.

EXAMPLE 2

Experiment 4 of the preceding example was repeated at 250° F. for 20 minutes and the products obtained were as follows:

Products Yield (grams)
- Low-boiling products _____ 0
- Acrylic acid _____ 6
- Propionic acid _____ 1
- Beta-acetoxy propionic acid _____ 25
- Carbon dioxide _____ 30

The experiment was repeated by charging to the autoclave 500 grams acetic acid containing 1 gram palladous chloride, 10 grams cupric chloride, 10 grams sodium chloride and 10 grams sodium acetate trihydrate. Carbon monoxide was introduced to raise the autoclave pressure to 600 p.s.i.g. and then 300 p.s.i.g. of ethylene was introduced. The autoclave was heated to 250° F. and maintained at that temperature while incremental amounts of oxygen and nitrogen were alternately added over a 20 minute reaction period. The following yields of products were obtained:

Table
Products Yield (grams)
- Acrylic acid _____ 6.7
- Beta acetoxy propionic acid _____ 42
- Propionic acid _____ 0
- Other high-boiling products _____ 18
- Carbon dioxide _____ 46

The preceding experiment was repeated, however the amounts of the added salts were changed to 5 grams cupric chloride, 5 grams sodium chloride and 5 grams sodium acetate trihydrate. The oxidation was performed at 300° F. and the following products were obtained:

Table

| Products | Yield (grams) |
|---|---|
| Acrylic acid | 6.6 |
| Beta acetoxy propionic acid | 83 |
| Propionic acid | 1.6 |
| Other high-boiling products | 2.2 |
| Carbon dioxide | 50 |

EXAMPLE 3

To demonstrate the use of other redox agents, the experiment was performed with the substitution of lithium nitrate for the cupric salt employed by charging to the autoclave 500 grams acetic acid containing 1 gram palladous chloride, 5 grams lithium chloride, 5 grams lithium acetate and 5 grams lithium nitrate. The autoclave was pressured to 600 p.s.i. with carbon monoxide and then 300 p.s.i. of ethylene was introduced. The autoclave was heated to 280° F. and maintained at that temperature for the 20-minute reaction period during which alternate introductions of oxygen and nitrogen were introduced. The yields of products produced were as follows:

Table

| Products | Yield (grams) |
|---|---|
| Acrylic acid | 5.9 |
| Beta acetoxy propionic acid | 7.0 |
| Propionic acid | 1.3 |
| Other high-boiling products | 1.8 |
| Carbon dioxide | 33 |

The preceding experiment was repeated, however 5 grams of cupric chloride were also added to the autoclave. The yields of products were as follows:

Table

| Products | Yield (grams) |
|---|---|
| Acrylic acid | 10.5 |
| Beta acetoxy propionic acid | 36 |
| Propionic acid | 2.7 |
| Other high-boiling products | 3.7 |
| Carbon dioxide | 54 |

EXAMPLE 4

The carbonylation was performed with varied solvents. The catalyst was 1 gram palladous chloride, 5 grams lithium chloride, 5 grams lithium acetate dihydrate and 5 grams cupric chloride. The carbonylation was performed with 450 p.s.i. each of ethylene and carbon monoxide, and sufficient nitrogen was added to bring the total pressure to 1100–1200 p.s.i.g. The temperature was maintained at 280° F. and the following results were obtained with oxygen introduction over a twenty-minute reaction period:

The experiment was repeated; however, 1 gram palladium chloride, 5 grams ferric chloride, 5 grams lithium acetate dihydrate and 1 gram cupric chloride were used with the catalyst components. The yields of products are shown in the following table:

Table

| Products | Yield (grams) |
|---|---|
| Acrylic acid | 13.2 |
| Beta acetoxy propionic acid | 87 |
| Propionic acid | 0 |
| Other | 4 |

EXAMPLE 5

The effect of acetate ion concentration was determined by a series of experiments wherein the acetate ion concentration was varied by the addition of varied equivalent weights of acetate salts or bases to the acetic acid solvent. In all these experiments the following reaction medium and catalyst components were used:

| Component | Grams |
|---|---|
| Acetic acid | 500 |
| Palladous chloride | 1 |
| Cupric chloride | 5 |
| Lithium chloride | 5 |

The reaction was performed by charging the autoclave with 450 p.s.i. of ethylene, then 450 p.s.i. of carbon monoxide and heating to 280° F. The reactions were continued for 20 minutes at that temperature with incremental additions of oxygen.

The following table summarizes the amount of added base or acetate salt and the yields of products:

TABLE

| Experiment | Additive Identity | Grams | Acetate normality | Acrylic | Beta acetoxy propionic | Propionic | Other | CO₂ |
|---|---|---|---|---|---|---|---|---|
| 15 | Lithium acetate | 15 | 0.3 | 17.6 | 48 | 1.8 | 6.3 | 44 |
| 16 | do | 10 | 0.2 | 12.9 | 48 | 1.2 | | 36 |
| 17 | do | 5 | 0.1 | 33.1 | 61 | | | 45 |
| 18 | Tributyl amine | 40 | 0.4 | 33.4 | 21 | 2.9 | 2.5 | 36 |
| 19 | do | 20 | 0.2 | 47.3 | 30 | 2.2 | 2.5 | 47 |
| 20 | Pyridine | 20 | 0.5 | 21.7 | 18 | Trace | 3 | 45 |
| 21 | Diethyl amine | 20 | 0.5 | 14.5 | 30 | 1.4 | | 61 |
| 22 | do | 10 | 0.2 | 12.0 | 42 | 1.7 | 10.6 | 52 |
| 23 | Lithium acetate / Triethyl amine | 5 / 10 | 0.3 | 26 | 33 | 2.4 | 6.6 | 60 |

The preceding table indicates that in the oxidative carbonylation of ethylene, a preferred acetate concentration in acetic acid is from about 0.01 to about 0.7 normality and most preferably from about 0.04 to about 0.3 normality.

The preceding examples are intended solely to illustrate a mode of practicing my invention and to demonstrate results obtainable thereby. It is not intended that these examples be unduly limiting of the invention, but rather it is intended that the invention be defined by the reagents and method steps and their obvious equivalents set forth in the following claims.

I claim:

1. The oxidative carbonylation of hydrocarbon olefins having from 2 to about 10 carbons to oxygenated products having one more carbon atom than said olefin and selected from the class consisting of alpha,beta-ethylenically unsaturated carboxylic acids and beta-acyloxy carboxylic acids that comprises introducing said olefin, carbon monoxide and oxygen into contact with a liquid reaction medium comprising an alkanoic acid containing from 0.001 to about 2.0 weight percent of a Group VIII

| | Solvent (grams) | | Products (grams) | | | |
|---|---|---|---|---|---|---|
| Experiment | Acetic Acid | Other | Acrylic | Beta Acetoxy Propionic | Propionic | Othe |
| 12 | 300 | 300 sulfolane | 3.8 | 0 | 1 | 0 |
| 13 | 300 | 300 o-dichlorobenzene | 17.5 | 57 | 3.9 | 10.5 | noble metal compound soluble in the reaction medium and a redox compound selected from the class consisting of from about 0.1 to 10 weight percent of a soluble salt of a multivalent metal having an oxidation potential more positive than the Group VIII noble metal and from 0.01 and 3 weight percent of a soluble nitrate or nitrite salt while maintaining the reaction zone at a temperature between about 30° and 300° C. and sufficient pressure to maintain the reaction medium liquid under the reaction conditions and maintaining the partial pressure of carbon monoxide in said reaction zone from about 40 to about 70 percent of the total reaction pressure.

2. The oxidative carbonylation of claim 1 wherein said platinum group metal compound is a palladium compound.

3. The oxidative carbonylation of claim 1 wherein said olefin is ethylene and said oxygenated products are acrylic and beta acetoxy propionic acids.

4. The oxidative carbonylation of claim 1 wherein said liquid reaction medium comprises an acetic acid solution of palladous chloride.

5. The oxidative carbonylation of claim 1 wherein said solvent contains a soluble acetate salt at a concentration of from 0.1 to about 0.3 normality.

References Cited

UNITED STATES PATENTS 3,349,119   10/1967   Fenton et al. _____ 260—497

FOREIGN PATENTS 6,408,476   1/1965   Netherlands.

OTHER REFERENCES

Tsuji et al., Tetrahedron Letters, No. 16, pp. 1061–1064, 1963.

LORRAINE A. WEINBERGER, Primary Examiner

V. GARNER, Assistant Examiner

U.S. Cl. X.R.

260—533, 499, 604, 541, 413; 252—416